(12) United States Patent
Khandelwal et al.

(10) Patent No.: US 10,460,059 B1
(45) Date of Patent: Oct. 29, 2019

(54) SYSTEM AND METHOD FOR GENERATING REDUCED STANDARD DELAY FORMAT FILES FOR GATE LEVEL SIMULATION

(71) Applicant: Cadence Design Systems, Inc., San Jose, CA (US)

(72) Inventors: Akash Khandelwal, Cupertino, CA (US); Pawan Kulshreshtha, San Jose, CA (US); Rajarshi Mukherjee, San Jose, CA (US); Chih-kuo Yu, San Jose, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 138 days.

(21) Appl. No.: 14/747,872

(22) Filed: Jun. 23, 2015

(51) Int. Cl.
*G06F 17/50* (2006.01)
*G01R 31/317* (2006.01)

(52) U.S. Cl.
CPC ........ G06F 17/505 (2013.01); G06F 17/5031 (2013.01); *G01R 31/31725* (2013.01); *G06F 2217/84* (2013.01)

(58) Field of Classification Search
CPC ............... G06F 17/505; G06F 17/5031; G06F 2217/84; G01R 31/31725
See application file for complete search history.

*Primary Examiner* — Vuthe Siek
*Assistant Examiner* — Aric Lin
(74) *Attorney, Agent, or Firm* — Vista IP Law Group, LLP (57) ABSTRACT

A system and method for generating standard delay format (SDF) files is disclosed. For each timing closed hierarchical instance, timing arcs on internal register to register paths may be marked as zero delay arcs. If the zero delay causes a hold violation, an adjustment may be computed to fix the violation. If the adjustment does not cause a setup violation, the adjustment may be applied to the end point register.

17 Claims, 5 Drawing Sheets

SYSTEM AND METHOD FOR GENERATING REDUCED STANDARD DELAY FORMAT FILES FOR GATE LEVEL SIMULATION

TECHNICAL FIELD

The embodiments of the invention generally relate to generating reduced Standard Delay Format files for use in integrated circuit design validation.

BACKGROUND

Standard Delay Format ("SDF") is a file format used in certain electronic design automation tools to represent timing data of an integrated circuit design. The timing data includes delay information between input and output pins ("arc delays"). Static timing analysis tools generate SDF files for integrated circuit designs SDF files, along with specific test patterns, are then provided as input stimulus to gate level simulators.

The gate level simulators are used to perform simulations of integrated circuit designs. A full chip SDF file provided by a static timing analysis tool contains delays for all timing arcs of the integrated circuit design. These simulations are a critical step in integrated circuit design validation to ensure that a design adheres to its corresponding specification and that there are no violations in the design.

Integrated circuit designs are becoming more and more complex. As transistor sizes continue to shrink, engineers are able to add more logic to integrated circuit designs. With increasingly complex integrated circuit designs, resulting SDF files used in gate level simulation are also increasing in size. Larger SDF files place a burden on gate level simulators by requiring longer runtimes and larger memories. Thus, there is a need to reduce the runtime and memory requirements required of gate level simulators.

BRIEF DESCRIPTION OF THE DRAWINGS

The invention is illustrated by way of example and not limitation in the figures of the accompanying drawings, in which like references indicate similar elements, and in which.

DETAILED DESCRIPTION

A system and method for generating reduced Standard Delay Format files is provided below. For example, in accordance with one embodiment, the system may comprise a graphical user interface that receives an input, wherein the input comprises an integrated circuit design. A processor may be coupled to the graphical user interface to generate a SDF file using the input. A memory may be coupled to the processor, wherein the memory stores instructions that when executed cause the processor to mark internal register to register data paths of the SDF file for zero delay, and to apply a delay adjustment for each end point with a hold time violation due to the zero delay marking if the delay adjustment does not result in a setup time violation.

In accordance with another embodiment, the method may comprise loading an integrated circuit design, standard cell libraries, parasitic data, and design constraints to a design automation tool. A processor of the design automation tool may execute instructions that performs the following operations: calculating delays of the integrated circuit design; marking internal register to register data paths for zero delay; calculating delay adjustments for marked zero delay paths that create hold time violations if the delay adjustments do not create setup time violations.

A Standard Delay Format file is also provided below. The SDF file may comprise a first register, wherein the first register has a data input, a clock input, and a data output, wherein the first register has a defined positive timing arc. The SDF file may further comprise a second register coupled to the first register, wherein the second register has a data input, a clock input, and a data output, wherein the data input of the second register is coupled to the data output of the first register, wherein a data path comprising at least the first register is marked for zero delay, wherein if the zero delay marking causes a hold time violation of the second register, a delay adjustment is added to the second register if the delay adjustment does not cause a hold time violation of the second register.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description.

In the following detailed description, numerous specific details are set forth in order to provide a thorough understanding of the invention. However, it will be understood by those skilled in the art that the present invention may be practiced without these specific details. In other instances, well-known methods, procedures, components, and circuits have not been described in detail so as not to obscure the present invention.

Figure 1:
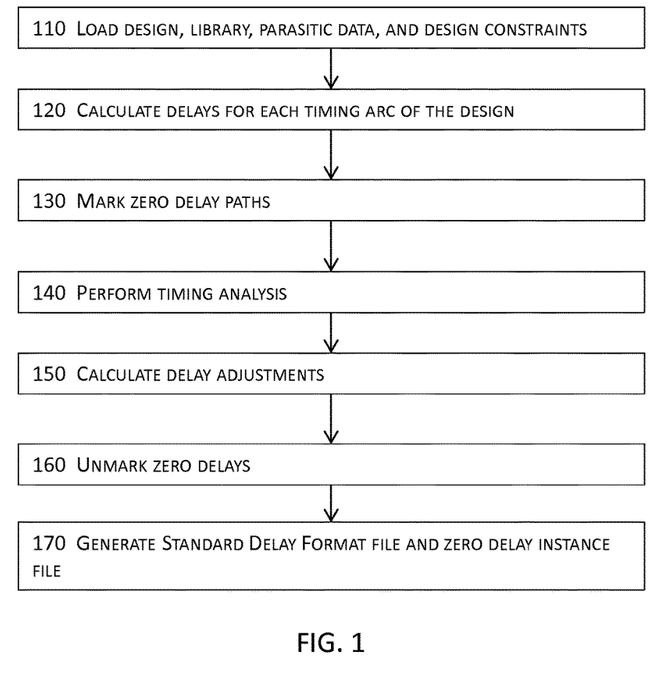
FIG. 1 is a flowchart of a SDF creation method in accordance with one embodiment of the invention.

One aspect of the present invention is to generate a SDF file that enables the reduction of simulator run time and memory requirements. A flowchart that details an embodiment for generating a SDF file is depicted in FIG. 1. In operation 110, an integrated circuit design, standard cell libraries, parasitic data, and design constraints are loaded to an electronic design automation (EDA) software tool. For one embodiment of the invention, the software tool is a static timing analysis tool that, in part, calculates circuit timing delays over possible input combinations.

The integrated circuit design may be a post-synthesis gate level netlist that includes descriptions of the components used, and placement and routing information. The integrated circuit design may be comprised of a plurality of digital and analog components. The digital components may include registers, buffers, logic gates, etc. Components of the integrated circuit design may be selected from and implemented with components of the standard cell libraries. Each standard cell library component may include sizing and timing information. Each time a component is used, that use is considered an "instance."

The parasitic data may be in Standard Parasitic Exchange Format, and may include resistance and capacitance parameters for wires used in chip interconnects. The design constraints may define the timing, power, and area limitations of the design.

Each integrated circuit design component comprises an input pin and an output pin. The timing arc of each component is the delay information between the input pin and the output pin of that component. In operation 120, delay calculations for each timing arc of the integrated circuit design is calculated by the software tool. The delay calculations may depend, at least in part, on the timing information for each component of the integrated circuit design as defined by the standard cell libraries, and the resistance and capacitance parameters defined by the parasitic data.

The software tool may also provide full-chip static timing analysis with gate-level delay calculations, signoff-level timing and signal integrity analysis, statistical timing and leakage analysis, and on-chip variation analysis. Register to register paths that meet timing requirements are considered "timing closed." In operation 130, for each timing closed hierarchical instance, timing arcs on internal paths are marked as zero delay arcs. In other words, the delay for each component up to the end point register in an internal path is marked as having zero delay.

For another embodiment of the invention, in operation 130, all timing arcs on internal register to register paths except timing arcs in the fan-in or fan-out of the hierarchical instance outputs or inputs are marked as zero delay arcs. Initially, all the timing arcs of timing closed hierarchical instances are marked except clock paths. Subsequently, for each hierarchical instance, all the timing arcs on paths in the fan-in of hierarchical instance outputs are unmarked. Similarly, for each hierarchical instance, all the timing arcs on paths in the fan-out of hierarchical instance inputs are unmarked. Additionally, any loop that the software tool breaks during static timing analysis is unmarked to prevent zero delay loops during functional simulation. An example of this embodiment for marking zero delay arcs is described in further detail below and in FIG. 3A.

In operation 140, the software tool again computes the expected timing of the integrated circuit design with the zero delays for marked timing arcs. For each end point register which now has a hold violation due to a marked zero delay arc, an adjustment is computed in operation 150 to correct the violation. This adjustment is explained in more detail below. If the adjustment does not cause a setup violation, the adjustment is applied to the end point register.

On the other hand, if the adjustment causes a setup violation, the end point register is collected for zero delay unmarking in operation 160. For each end point register collected for unmarking, all the zero delay markings from the preceding register are removed or reset back to its original values to avoid a hold time violation.

In operation 170, the software tool generates at least a SDF file and a zero delay instance file. The SDF file may include a listing of the arcs, and each of the arcs' corresponding delays. For one embodiment of the invention, the SDF file may include only delays for arcs which are not marked as zero delay arcs. The zero delay instance file may include a listing of instances with zero delay marking.

Figure 2:
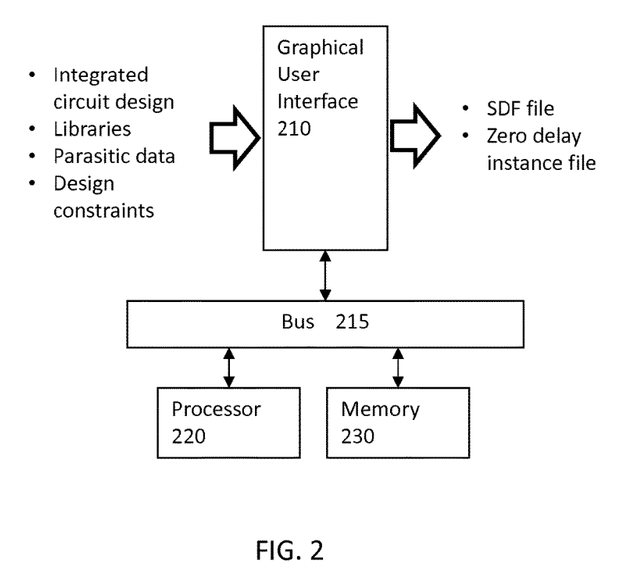
FIG. 2 is a block diagram of a computer system in accordance with one embodiment of the invention.

FIG. 2 depicts one embodiment of a computer system capable of generating reduced SDF files based on setup time and hold time analysis. The computer system includes at least a graphical user interface 210, a bus 215, a processor 220, and a memory 230. The graphical user interface 210 may be coupled to the bus 215. The bus 215 may be coupled to the processor 220 and the memory 230.

The graphical user interface 210 may be used by a user to input an integrated circuit design, libraries, parasitic data, and design constraints. This information may then be communicated to and from the processor 220 or the memory 230 via the bus 215.

The memory 230 may be any computer-readable medium, including a single medium or multiple media, such as a centralized or distributed database, and/or associated caches and servers that store one or more sets of instructions. The computer-readable medium may also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium may include a solid-state memory such as a memory card or other package that houses one or more non-volatile read-only memories. Further, the computer-readable memory may be a random access memory or other volatile re-writable memory. Additionally, the computer-readable medium may include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

The memory 230 may store instructions that control the processor 210 to perform certain operations. In addition, the memory 230 may store an integrated circuit design, standard cell libraries, parasitic data, and design constraints.

The instructions stored in storage device 230 may direct the processor 210 to perform the operations set forth in the flowchart of FIG. 1, and as described in detail above. The contents of the SDF file and zero delay instance file generated by the processor 210 may be viewed by a user through the graphical user interface 210.

Figure 3A:
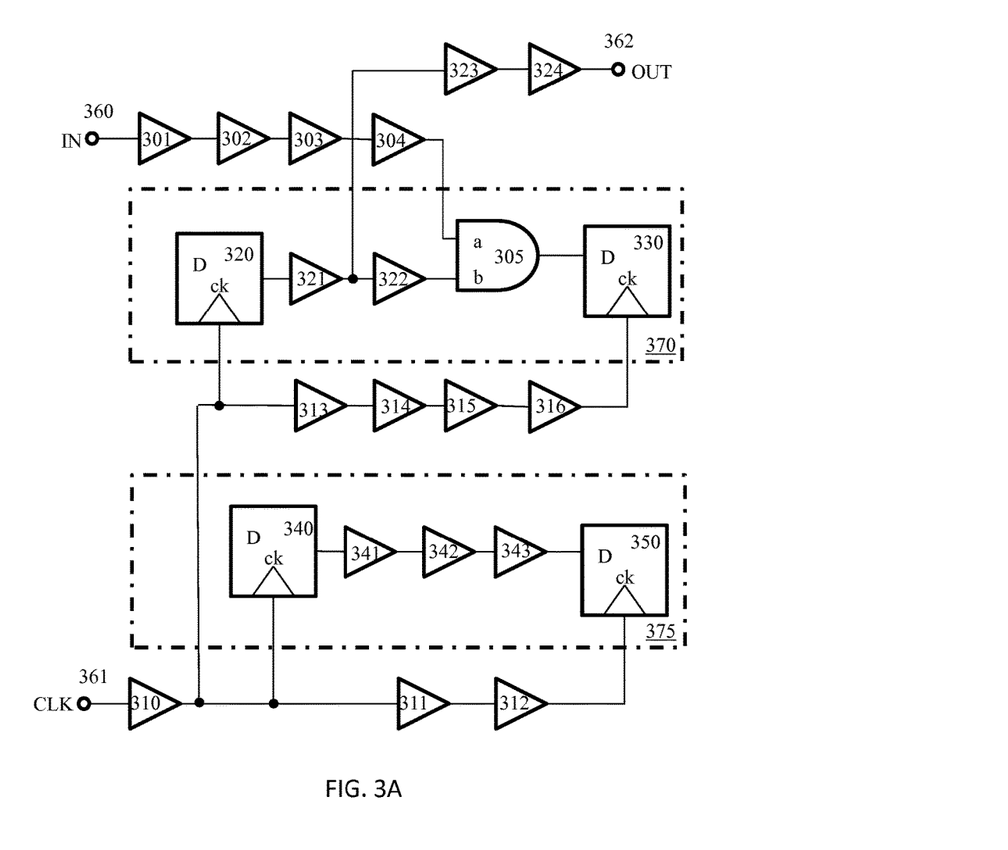
FIG. 3A is a schematic diagram that illustrates internal register to register paths for zero delay marking.

FIG. 3A is a circuit diagram that illustrates internal register to register paths for zero delay markings. The circuit diagram includes: buffers 301-304, 310-316, 321-324, 341-343; AND gate 305; registers 320, 330, 340, 350; input ("IN") pin 360; clock ("CLK") pin 361; and OUT pin 362. Each of the foregoing components may have a positive delay value. The positive delay value of each component may be defined by a standard cell library.

Each of registers 320, 330, 340, 350 has a data ("D") input, a clock ("ck") input, and an output. Each of buffers 301-304, 310-316, 321-324, 341-343 has an input and an output. AND gate 305 has two inputs ("a" and "b") and an output.

A data signal may be provided to pin 360 and input to buffer 301. A clock signal may be provided to pin 361 and input to buffer 310. A data signal may be obtained from the output of buffer 324 at pin 362.

The output of buffer 310 is coupled to the clock input of register 320, the input of buffer 311, and the input of buffer 313. The output of register 320 is coupled to the input of buffer 321. The output of buffer 321 is coupled to the input of buffer 322 and the input of buffer 323. The output of buffer 323 is coupled to the input of buffer 324.

The output of buffer 311 is coupled to the input of buffer 312. The output of buffer 312 is coupled to the clock input of register 350.

The inputs of AND gate 305 are coupled to buffers 301-304 and buffers 321-322, and the output of AND gate 305 is coupled to the data input of register 330. Buffers 341-343 are coupled between the output of register 340 and the data input of register 350.

The clock inputs of registers 320 and 340 are coupled to buffer 310. The clock input of register 330 is coupled to buffers 313-316. The clock input of register 350 is coupled to buffers 310-312.

In this example circuit diagram, there are two internal register to register paths 370 and 375 that are marked for zero delay. The first register to register path includes registers 320 and 330, buffers 321-322, and AND gate 305. A second register to register path includes register 340 and 350 and buffers 341-343. Only the internal register to register paths are marked for zero because fan-in of output pins, fan-out of input pins, and clock paths are unmarked.

Figure 3B:
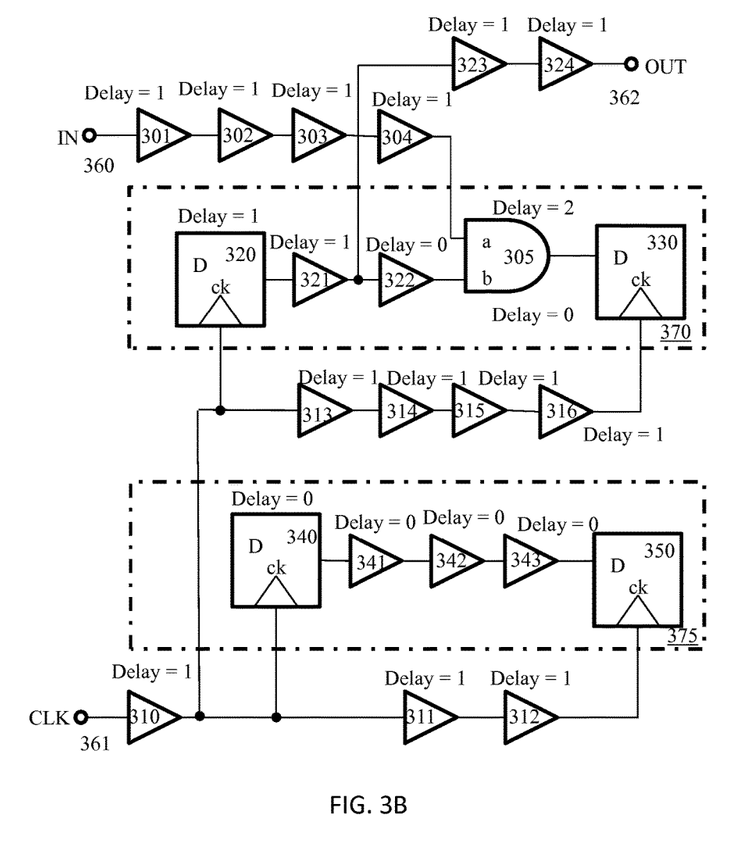
FIG. 3B is a schematic diagram that includes the initial delay values used to perform static timing analysis.

FIG. 3B shows the circuit of FIG. 3A with initial delay markings for performing static timing analysis. With the exception of the zero delay markings, each of the components of the circuit has a positive delay.

Although register 320 and buffer 321 are part of the first register to register path, they are unmarked because they are part of the output pin fan-in path. Further, end point registers 330 and 350 are not marked because there is typically negligible delay at the data input of registers.

In some cases, zero delay marking may result in hold time violations. Potential setup and hold time violations are determined based on calculated setup slack and hold slack. For one embodiment of the invention, the equations for setup slack and hold slack are as follows:

$$\text{Setup slack} = \text{clock period} - \text{ArrD}(L) + \text{ArrCK}(E) - \text{setup check arc delay} \quad (1)$$

$$\text{Hold slack} = \text{ArrD}(E) - \text{ArrCK}(L) - \text{hold check arc delay} \quad (2)$$

For the above equations, ArrD (E) and ArrD (L) are the early arrival time and the late arrival time, respectively, at the data input of a register. ArrCK (E) and ArrCK (L) are the early arrival time and late arrival time, respectively, at the clock input of a register. Setup check arc delay and hold check arc delay may be a timing constraint of a register as defined by a standard cell library.

There are potentially two different arrival times to the data input of register 330. The first path to the data input register 330 includes delays through buffers 301-304 and the delay through AND gate 305. Because the delay through the buffers 301-304 is 4 (each buffer 301-304 has a delay of 1) and the delay through the "a" input of AND gate is 305 is 2, the total delay through this first path is 6.

The second path to the data input of register 330 includes delays through buffer 310, register 320, buffers 321-322, and AND gate 305. The delay through buffer 310 is 1; the delay through register 320 is 1; the delay through buffer 321 is 1; and the delays through buffer 322 and the "b" input of AND gate 305 are zero because both were marked for zero delay. Thus, the total delay through this second path is 3.

Because the total delay through the first path is greater than the total delay through the second path, the first delay path is ArrD (L) and the second delay path is ArrD (E).

There is only one path to the clock input of register 330. That path includes buffer 310, and buffers 313-316. Because the delay through each buffer is 1, the total delay is 5. The ArrCK (E) and the ArrCL (L) are thus the same value in this example.

There is only one path to the data input of register 350. That path includes buffer 310, register 340, and buffers 341-343. Because register 340 and buffers 341-343 were marked for zero delay, the delay to the data input of register 350 is equal to the delay of only buffer 310. The ArrD (E) and the ArrD (L) thus both equal 1 in this example.

Similarly, there is only one path to the clock input of register 350. That path includes buffer 310, buffer 311, and buffer 312. Because each buffer 310-312 has a delay of 1, the total delay is 3. ArrCK(E) and ArrCK (L) are thus both 3 in this example.

For illustrative purposes, the clock period is 2, and the setup check arc delay and hold check arc delay are both 0. As such, the setup slack for register 330 may be calculated in accordance to equation (1) as follows:

$$\text{Setup slack} = \text{clock period} - \text{ArrD}(L) + \text{ArrCK}(E) -$$
$$\text{setup check arc delay}$$
$$= 2 - 6 + 5 - 0$$
$$= 1$$

The hold slack for register 330 may be calculated in accordance with equation (2) as follows:

$$\text{Hold slack} = \text{ArrD}(E) - \text{ArrCK}(L) - \text{hold check arc delay}$$
$$= 3 - 5 - 0$$
$$= -2$$

The setup slack for register 350 may be calculated in accordance with equation (1) as follows:

$$\text{Setup slack} = \text{clock period} - \text{ArrD}(L) + \text{ArrCK}(E) -$$
$$\text{setup check arc delay}$$
$$= 2 - 1 + 3 - 0$$
$$= 4$$

The hold slack for register 350 may be calculated in accordance with equation (2) as follows:

$$\text{Hold slack} = \text{ArrD}(E) - \text{ArrCK}(L) - \text{hold check arc delay}$$
$$= 1 - 3 - 0$$
$$= -2$$

Because the hold slack for registers 330 and 350 are negative, both registers 330 and 350 are flagged as having hold time violations. As set forth above, for one embodiment of the invention, for each end point with a hold time violation due to zero delay marking, a delay adjustment equal to the hold time slack violation may be applied if the delay adjustment is equal or less than the setup slack margin.

For the example circuit of FIG. 3B, if a delay adjustment of 2 is applied to register 350, the hold slack becomes 0 and the setup slack becomes 2. Thus, the hold time violation of register 350 is fixed without causing a setup time violation.

On the other hand, although a delay adjustment of 2 for register 330 would fix the hold time violation, the adjustment would result in a setup violation of −1. Because a delay adjustment to register 330 would cause a setup time violation, register 330 may be collected for zero delay unmarking. As a result of the zero delay unmarking, the timing arcs for buffer 322 and the "b" input of AND gate 305 may be reset to their respective original, positive delay values.

Figure 4:
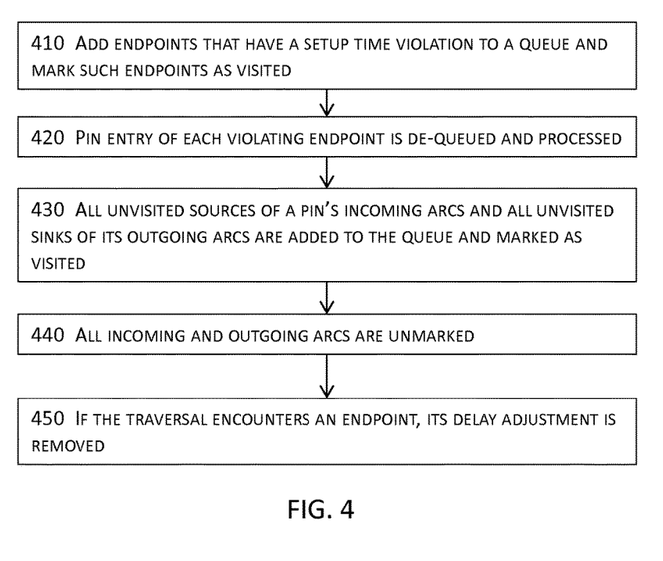
FIG. 4 is a flowchart of a method for resetting zero delay markings.

For one embodiment of the invention, the zero delay mechanism may be implemented using breadth first traversal. FIG. 4 shows an embodiment of the method. In operation 410, all of the violating endpoints may be initially added to a queue and marked as visited. All such endpoints or nodes that are marked as visited may avoid being traversed or processed again should the endpoints or nodes be part of another data path.

Subsequently, in operation 420, while the queue is not empty, a pin entry of each violating endpoint is de-queued and processed. In operation 430, all unvisited sources of a pin's incoming arcs and all unvisited sinks of its outgoing arcs, are added to the queue and marked as visited. In operation 440, all such incoming and outgoing arcs are unmarked expanding the unmarked frontier forward and backward. If the traversal encounters an endpoint, its delay adjustment, if any, is also removed since paths to this endpoint will have complete delays. The order of the traversal is linear in accordance to the number of arcs in a given path.

The generated SDF file includes a listing of all nets and instances which have at least one timing arc that is not marked for zero delay. Instances which have all timing arcs marked for zero delay are not included in the generated SDF file. For each end point, delay adjustment is added to the delays of all timing arcs to the end point while generating the SDF file.

The generated zero instance file includes a listing of all instances which have all of its timing arcs marked for zero delay. This information is used by the gate level simulator to reduce memory by not allocating certain data structures for the timing arcs marked for zero delay.

In the foregoing specification the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A system, comprising:
   a graphical user interface that receives an input, wherein the input comprises an integrated circuit design;
   a processor coupled to the graphical user interface to generate a Standard Delay Format (SDF) file using the input;
   a memory coupled to the processor, wherein the memory stores instructions that when executed cause the processor to:
   (a) generate a first type of file corresponding to the SDF file and a second type of file corresponding to a zero delay instance file by:
      marking internal register to register data paths of the first type of file for zero delay,
      applying a delay adjustment for each end point with a hold time violation due to the zero delay marking if the delay adjustment does not result in a setup time violation,
      generating the first type of file corresponding to the standard Delay Format (SDF) file that comprises a listing of first delay instances which have at least one timing arc that is not marked for zero delay, wherein the SDF files excludes timing arcs marked for zero delay, and
      generating the second type of file that corresponds to the zero delay instance file with the timing arcs marked for zero delay; and
   (b) operate a gate level simulator by:
      performing simulations of the integrated circuit design using the first type of file corresponding to the SDF file as an input for delay data to the gate level simulator, and
      implementing data structures for the gate level simulator with reduced memory by not allocating at least one data structure for a timing arc marked for zero delay based at least in part on the second type of file corresponding to the zero delay instance file.

2. The system of claim 1, wherein the integrated circuit design is in a gate level netlist format.

3. The system of claim 1, wherein the input further comprises a standard cell library, parasitic data, and design constraints.

4. The system of claim 3, wherein the parasitic data is in Standard Parasitic Exchange Format.

5. The system of claim 1, wherein delay adjustments that cause setup time violations are flagged, wherein zero delay markings are reset for flagged delay adjustments to avoid hold time violations.

6. The system of claim 1, wherein marked internal register to register data paths include all timing arcs in the data paths except clock paths.

7. A method, comprising:
   loading an integrated circuit design, standard cell libraries, parasitic data, and design constraints to a design automation tool, wherein a processor of the design automation tool that executes instructions performs operations comprising:
   (a) generating a first type of file corresponding to a Standard Delay Format (SDF) file and a second type of file corresponding to a zero delay instance file by:
      calculating delays of the integrated circuit design,
      marking internal register to register data paths of the first type of file for zero delay,
      calculating delay adjustments for marked zero delay paths that create hold time violations if the delay adjustments do not create setup time violations,
      generating the first type of file corresponding to the SDF file that comprises a listing of first delay instances which have at least one timing arc that is not marked for zero delay, wherein the SDF files excludes timing arcs marked for zero delay, and
      generating the second type of file that corresponds to the zero delay instance file with the timing arcs marked for zero delay; and
   (b) operating a gate level simulator by:
      performing simulations of the integrated circuit design using the first type of file corresponding to the SDF file as an input for delay data to the gate level simulator, and
      implementing data structures for the gate level simulator with reduced memory by not allocating a data structure for a timing arc marked for zero delay based at least in part on the second type of file corresponding to the zero delay instance file.

8. The method of claim 7, wherein the design automation tool is a static timing analyzer tool.

9. The method of claim 7, further comprising:
unmarking zero delay paths for delay adjustments that create setup time violations.

10. The method of claim 9, wherein unmarking zero delay paths is implemented using breadth first traversal.

11. The method of claim 7, further comprising:
generating a listing of all instances that have timing arcs marked for zero delay.

12. The method of claim 7, further comprising:
generating a Standard Delay Format file that includes a listing of all nets and instances which have at least one timing arc that is not marked for zero delay.

13. A non-transitory computer readable medium comprising a sequence of instructions which, when executed by a processor, cause a set of acts, the set of acts comprising:
loading an integrated circuit design, standard cell libraries, parasitic data, and design constraints to a design automation tool, wherein a processor of the design automation tool that executes instructions performs operations comprising:
(a) generating a first type of file corresponding to a Standard Delay Format (SDF) file and a second type of file corresponding to a zero delay instance file by:
calculating delays of the integrated circuit design,
marking internal register to register data paths of the first type of file for zero delay,
calculating delay adjustments for marked zero delay paths that create hold time violations if the delay adjustments do not create setup time violations,
generating the first type of file corresponding to the SDF file that comprises a listing of first delay instances which have at least one timing arc that is not marked for zero delay, wherein the SDF files excludes timing arcs marked for zero delay, and
generating the second type of file that corresponds to the zero delay instance file with the timing arcs marked for zero delay; and
(b) operating a gate level simulator by:
performing simulations of the integrated circuit design using the first type of file corresponding to the SDF file as an input for delay data to the gate level simulator, and
implementing data structures for the gate level simulator with reduced memory by not allocating a data structure for a timing arc marked for zero delay based at least in part on the second type of file corresponding to the zero delay instance file.

14. The computer readable medium of claim 13, wherein the design automation tool is a static timing analyzer tool.

15. The computer readable medium of claim 13, the set of acts further comprising:
unmarking zero delay paths for delay adjustments that create setup time violations.

16. The computer readable medium of claim 15, wherein unmarking zero delay paths is implemented using breadth first traversal.

17. The computer readable medium of claim 13, the set of acts further comprising:
generating a listing of all instances that have timing arcs marked for zero delay.

\* \* \* \* \*